United States Patent Office 2,698,937
Patented Jan. 4, 1955

2,698,937

ETHERIFICATION OF STARCH

Max A. Staerkle, Baech, Emil Meier, Waedenswil, and Clo Christoffel, Ramosch, Switzerland, assignors to Blattmann & Co., Waedenswil, Switzerland, a partnership of Switzerland No Drawing. Application March 17, 1953, Serial No. 342,988

11 Claims. (Cl. 260—233.3)

This invention relates to a new and improved process for producing derivatives of starch and, more particularly, starch condensation products such as starch ethers and acetal starches.

An object of the invention is to provide a process by which powdery starch materials can be converted into improved starch derivatives having definitely determined and quite distinctive combinations of solubility and viscosity properties, and which are extraordinarily homogeneous in their chemical and physical properties.

Another object of the invention is to provide a process for producing etherified or acetal derivatives of starch more quickly and more efficiently than in known practices, which reduces reagent requirements, increases the output of conversion equipment and otherwise reduces costs of production.

According to the disclosure of a copending United States patent application, Serial No. 208,972, filed February 1, 1951, the production of starch dextrinization products, among other things, can be carried out with precision and so as to obtain valuable new soluble starches, dextrins, British gums, and the like, by first dehydrating a mass of powdery starch material at temperatures below dextrinization temperatures, such as by heating and stirring the mass under vacuum, preferably in the presence of a dextrinizing chemical, until the material is rid of free moisture and so anhydrous that substantially no moisture will evaporate from it in the ensuing steps; and thereafter heating and stirring the dehydrated powdery material at substantially increased temperatures in a non-oxidizing environment such as a vacuum or a non-oxidizing gas until the material is degraded thermally to a desired degree, whereupon the product is cooled in a non-oxidizing environment.

According to the disclosure of another copending application, Serial No. 208,971, filed February 1, 1951, valuable starch condensation products of the nature of starch ethers or acetal starches can be produced to advantage by the use of a similar process but in which powdery starch materials are subjected to the low temperature dehydration in the presence of starch condensation agents such as acetal-forming agents or etherification or esterification agents. These agents preferably are used in conjunction with suitable catalysts, which not only may promote the condensation reactions but also may act as starch hydrolysis or degradation agents.

It has now been found that starch derivatives can be produced so as to achieve the objects hereinabove mentioned by making use of principles disclosed in said copending applications but supplying a suitable starch condensation agent to the powdery starch material after the dehydration of the material is completed, while excluding oxygen from the material and heating it at elevated temperatures. In this way controlled degrees of condensation giving desired changes of molecular structure and desired physical properties can be brought about in the dehydrated material at elevated reaction temperatures which are maintained homogeneously in the reaction material and which promote extraordinarily efficient condensation reactions. In the same stage of the process the dehydrated material can be heated so that it will undergo a controlled degree of thermal conversion or degradation during any desired period before or after, or both before and after, the condensation agent is supplied to it.

Thus the present invention provides a process for producing valuable starch derivatives, in which a suitable starch condensation agent is supplied to and reacted with a dehydrated powdery starch material containing no free moisture while the material is continuously stirred and excluded from oxygen and heated at an elevated temperature which preferably is substantially above 125° C. The dehydrated material so treated preferably contains a condensation catalyst, which may be alkaline, acidic or neutral, depending upon the nature of the condensation agent and properties desired in the end product.

According to the preferred embodiments of the invention, a mass of powdery starch material containing free moisture is first dehydrated progressively by heating it under vacuum at temperatures below dextrinization temperatures, if desired in the presence of one or more starch modifying chemicals or catalysts, until the material is rid of free moisture and so anhydrous that any moisture which it still contains will not evaporate in the ensuing steps. The dehydrated powdery material then is continuously stirred and heated with the exclusion of oxygen, for example, in a vacuum or a non-oxidizing or inert atmosphere, at a temperature above 125° C., and while it is so treated a suitable condensation agent is supplied to and reacted with the powdery mass. The condensation reaction may be preceded or followed, or both, by a period of thermal treatment or degradation at any desired dextrinization temperature. When the desired end product has formed it is cooled with the continued exclusion of oxygen.

Various starch condensation reactions can be brought about in this process by adding suitable condensation agents to the starch material. These agents may include acetal-forming substances or etherification, esterification or addition agents; for example, aldehydes, or aldehyde-liberating compounds such as paraformaldehyde, hexamethylenetetramine, polyoxymethylene, mono- or polymethylol ureas, aldehyde bisulfites, or the like, or mono- or tri-chloracetic acid, alkylene oxides such as ethylene oxide, alkyl halides such as ethyl chloride, diazomethane, ethylene chlorhydrin, epichlorhydrin, or the like. Catalysts known to be useful for reactions with such agents can be supplied to the starch material prior to the addition of the condensation agent. For example, the starting material may be impregnated with a base, an acid or a salt, for example, by mixing it with a solution of NaOH in alcohol or by impregnating it with HCl gas, before or in the course of the dehydration stage of the process.

The starch condensation agent preferably is supplied to the dehydrated starch material in a finely dispersed condition and while the material is being stirred under vacuum or in a non-oxidizing gas. A normally solid condensation agent may be introduced in powder form, while a condensation agent in the form of a liquid or a solution is preferably introduced as a fine mist or spray. Only a relatively small quantity of the condensation agent is required. Although the condensation reaction may yield water as a by-product, the quantity is so limited that the water is retained in the reaction material and does not become free water or interfere with the homogeneity of the thermal treatment.

The starting material used in this process may be powdered raw starch in a commercially dry to moist condition, or a predried starch powder, or a powdery starch product which has been pretreated chemically or biochemically or by physical means or by a combination of chemical, biochemical and physical agencies; for example, it may be a powdery alkaline-modified, acid-modified, enzyme-modified or thermally-modified starch product, or a starch powder modified by ultrasonic vibrations.

In the dehydration stage the starch material can be treated in any of the ways disclosed in said copending applications, depending upon the properties desired in the end product. The dehydration can be carried out without the addition of a starch modifying chemical, particularly if the starting material has been pretreated as indicated above; or it may be carried out in the presence of one or more modifying chemicals, which may be a hydrolysis or dextrinizing agent, for example, any of various acids, bases, salts and enzymes; or a condensation agent of the character above described, which may be used in the presence of any desired catalyst.

The presence of a condensation catalyst in the dehydrated material is advantageous in any event as a means of promoting the condensation reaction brought about in the second or torrefaction stage of the process. When such a catalyst is used it not only may serve that purpose but also may have a degrading or modifying effect on the starting material in some cases.

When the entire process is carried out under vacuum the starch material becomes completely anhydrous or practically so before it can reach a dextrinization temperature. On the other hand, when the torrefaction is carried out in a non-oxidizing gas instead of a vacuum, a limited amount of bound or chemically combined moisture may be left in the dehydrated material. It is sufficient if the dehydration renders it so anhydrous that its residual moisture content does not yield free moisture under the conditions of the torrefaction. In general, starches which no longer give off moisture when heated under atmospheric pressure at temperatures of about 60° to 125° C. can still be made to yield considerable quantities of moisture, sometimes up to nearly 7% of their weight, when exhaustively tested under vacuum at a temperature of 160° C.

When starting the process with commercially dry to moist starch and operating under vacuum of the order of 90% the dehydration will have proceeded to the required extent after about 2 to 4 hours of heating. As the moisture content of the material is reduced its temperature is raised gradually to complete the dehydration without reaching the dextrinization temperature range of the starch. In general, the temperatures used for the dehydration are between 60° and 125° C., depending upon the degree of vacuum applied and the moisture content of the starch material at any moment.

The temperatures of heating applied in the thermal treatment of the dehydrated starch material generally are between 130° and 180° C., depending upon the temperature desired for any subsequent thermal degradation desired in the end product. When the desired end product is formed, it is cooled under the continued exclusion of oxygen. Virtually a 100% yield of the desired product is regularly obtained.

The properties of products obtained according to this process make these products exceptionally useful in paper coatings, as tub sizings, as binders for molding sands, as wall paper adhesives, as thickeners for textile printing compositions, and for other purposes.

The process of this invention can be applied with similar effects to starch materials from any source, including corn, wheat, potato, cassava, and other starches. It can be carried out completely in a single closed container or autoclave provided with suitable stirring means and suitable heating and cooling means. For the vacuum operation a low vacuum of the order produced by common vacuum pumps is sufficient, the degree of vacuum used being primarily influential upon the duration and temperature of the heating in the first reaction stage.

The following examples further illustrate ways of practicing the invention:

*Example 1.*—200 kg. of tapioca starch powder, after being placed under vacuum in an autoclave, is impregnated with 100 grams of HCl gas and then dehydrated by heating the material under vacuum for 3 hours, its temperature being gradually increased to 100° C. The measurable moisture content of the material is then about 3%. Under continued vacuum, the material is now heated rapidly to 160° C. (becoming completely anhydrous before its temperature exceeds 130° C.), and 200 grams of technical powdered paraformaldehyde is then fed into the autoclave and mixed homogeneously with the starch material. The material is then held at 160° C. under vacuum for about 80 minutes, or until a sample shows the desired degree of reaction, whereupon the product is cooled in the vacuum.

The starch product so obtained has extraordinarily stable physical and chemical properties and is alkaline resistant. It is especially valuable for use as a printing gum, and for other uses.

*Example 2.*—1000 kgs. of powdered corn starch is placed under vacuum and then continually dehydrated in vacuo until a temperature of 125° C. is reached, at which point the material is substantially completely anhydrous. The material is now heated under continued vacuum to a temperature of 150° C., whereupon 2 kgs. of powdered paraformaldehyde is added and the temperature is increased to 165° C. The material is then held at this last temperature under vacuum for about 75 minutes, whereupon the product is cooled in the vacuum. This product is about 15 to 20% soluble in water at 20° C. It is especially useful as a printing gum for textiles.

*Example 3.*—200 kgs. of powdered corn starch are placed under vacuum and thereafter impregnated with gaseous ammonia until a sample of the material shows a pH of 6.7. The material then is dehydrated in the vacuum for 2½ hours at temperatures below 125° C. Under continued vacuum, the temperature of the material is now increased to 170° C., and 300 grams of powdered paraformaldehyde is then added. The temperature of 170° C. is held under vacuum until a sample shows the desired degree of reaction, whereupon the material is cooled under vacuum. The product so obtained shows a solubility of about 2 to 5% in water at 20° C. and is useful as a thickener for textile printing pastes.

*Example 4.*—350 kgs. of potato starch powder is thoroughly blended with 260 grams of powdered paraformaldehyde, and then placed under vacuum and then impregnated with 80 grams of HCl gas. The mixture is then dehydrated by heating the material under vacuum until a temperature of 130° is reached. The vacuum is then replaced by nitrogen gas, whereupon the material is heated to 160° C. At this temperature and while preserving the nitrogen atmosphere an additional 260 grams of paraformaldehyde is fed into the reaction vessel and mixed with the starch material. The temperature is held at 160° C. for about 90 minutes, whereupon the product is cooled in the same nitrogen atmosphere. This product is useful as a paper adhesive, its solubility in water at 20° C. being about 30 to 60%. A 7½% aqueous solution, tested at 20° C. by the Hoeppler viscosimeter, shows a viscosity of about 50 centipoises.

*Example 5.*—200 kgs. of manioc starch powder is impregnated under vacuum with 110 grams of HCl gas. In the course of dehydrating the material by heating it under vacuum during 3 hours, 510 grams of glyoxal (in 35% solution) is added to the mass. The dehydration process is thereafter completed under vacuum while raising the temperature gradually to 150°, which temperature is held for 1½ hours, and in the course of this time 160 grams of powdered paraformaldehyde is introduced in intervals. The product is then cooled under vacuum. It shows a solubility of about 70 to 100% in water at 20° C., and the viscosity of a 30% solution at 20° C. is about 80 to 100 centipoises. Among other uses, it serves well as a binder for molding sands.

*Example 6.*—1000 kegs of sorghum starch powder under a 94% vacuum is impregnated with 480 grams HCl gas and thereafter dehydrated completely by heating the mass while stirring. Then the temperature is raised to 168° C. and this temperature is held for 45 minutes. At this point, while holding a vacuum, 1.2 kgs. of powdered paraformaldehyde is admitted, and the mass then is held at the same temperature for an additional 30 minutes. The end product is then cooled under continued vacuum. It is about 60 to 80% soluble in water at 20° C., and a 15% aqueous solution tested at 20° C. with a Hoeppler viscosimeter shows a viscosity of about 30 to 50 centipoises. Its properties make it quite useful as a paper adhesive.

*Example 7.*—300 kegs of powdered corn starch, impregnated with 10 liters of a 15% solution of sodium carbonate, is dehydrated under vacuum by heating the mass progressively until its water content is reduced to about 8%. Then the autoclave is sealed and a solution of 2 kgs. of ethylene chlorhydrine and 1 liter of sodium hydroxide (36° Bé.) is admitted while stirring the mass during 45 minutes. The dehydration then is continued by heating under vacuum until a temperature of 125° C. is reached. Now the vessel is sealed again and a second portion of 2 kgs. of ethylene chlorhydrine with 1 liter of sodium hydroxide is added. After a reaction period of 45 minutes the mass is dehydrated again by heating it under continued vacuum to 140° C. At this point the vessel is sealed and a last portion of 2 kgs. of ethylene chlorhydrine and 1 liter of sodium hydroxide 36° Bé. is added, whereupon the temperature of 140° C. is maintained until the desired degree of reaction is reached. The mass is then cooled under vacuum. In this way various desired products can be obtained, among them one useful as a textile printing gum, which is about 2 to 10% soluble in water at 20° C.

While the practice of this invention has been exemplified by the specification of various details and examples,

What is claimed is:

1. A process for producing starch derivatives which comprises supplying a starch etherification agent to and condensing the same with a dehydrated powdery starch material which contains no free moisture, while continuously stirring the material and excluding oxygen from it and heating it at a temperature substantially above 125° C.

2. A process for producing starch derivatives which comprises supplying an acetal-forming agent to and condensing the same with a dehydrated powdery starch material which contains no free moisture, while continuously stirring the material and excluding oxygen from it and heating it at a temperature substantially above 125° C.

3. A process for producing starch derivatives which comprises supplying powdered paraformaldehyde to and condensing the same with a dehydrated powdery starch material which contains no free moisture, while continuously stirring the material and excluding oxygen from it and heating it at a temperature substantially above 125° C.

4. A process for producing starch derivatives which comprises supplying a starch etherification agent to and condensing the same with a dehydrated powdery starch material which contains no free moisture, while continuously stirring the material and excluding oxygen from it and heating it at a temperature substantially above 125° C., and limiting the supplied quantity of said agent so that substantially all the water formed by the condensation is retained in the reaction material.

5. A process for producing starch derivatives which comprises dehydrating a powdery starch material at temperatures maintained below dextrinization temperatures until the material is rid of free moisture and so anhydrous that substantially no moisture evaporates from it in the ensuing steps, and thereafter, while continuously stirring and excluding oxygen from the dehydrated powdery material, increasing its temperature to a dextrinization temperature and then supplying a starch etherification agent to it to form a desired reaction product.

6. A process for producing starch derivatives which comprises dehydrating a powdery starch material at temperatures maintained below dextrinization temperatures until the material is rid of free moisture and so anhydrous that substantially no moisture evaporates from it in the ensuing steps, and thereafter, while continuously stirring and excluding oxygen from the dehydrated powdery material, increasing its temperature to a dextrinization temperature, then supplying a starch etherification agent to it, and then further heating it at a dextrinization temperature to form a desired reaction product.

7. A process for producing starch derivatives which comprises dehydrating a powdery starch material at temperatures maintained below dextrinization temperatures until the material is rid of free moisture and so anhydrous that substantially no moisture evaporates from it in the ensuing steps, and thereafter, while continuously stirring and excluding oxygen from the dehydrated powdery material, supplying a starch etherification agent to it and then heating it at substantially increased temperatures sufficient to degrade it thermally to form a desired reaction product.

8. A process for producing starch derivatives which comprises dehydrating a powdery starch material at temperatures maintained below dextrinization temperatures and in the presence of a starch modifying chemical until the material is rid of free moisture and so anhydrous that substantially no moisture evaporates from it in the ensuing steps, and thereafter, while continuously stirring and excluding oxygen from the dehydrated powdery material, heating it at substantially increased temperatures sufficient to degrade it thermally and supplying a starch etherification agent to it to form a desired reaction product.

9. A process for producing starch derivatives which comprises progressively dehydrating a mass of powdery starch material by heating and stirring it under vacuum at temperatures maintained below dextrinization temperatures until the material is substantially completely anhydrous; thereafter, while continuously stirring the anhydrous powdery material and maintaining it under vacuum, heating it to a dextrinization temperature and supplying to it a starch etherification agent to form a desired reaction product; and thereafter cooling the material under continued vacuum.

10. A process for producing starch derivatives which comprises progressively dehydrating a mass of powdery starch material which contains moisture and a starch modifying chemical by heating and stirring the material under vacuum and at a temperature not exceeding 130° C. until the material is substantially completely anhydrous; thereafter, while continuously stirring the anhydrous powdery material and maintaining it under vacuum, heating it to a temperature between 130° and 180° C., supplying to it a starch etherification agent and continuing the heating at a temperature between 130° and 180° C. to form a desired reaction product; and finally cooling the product under continued vacuum.

11. A process for producing starch derivatives which comprises progressively dehydrating a mass of powdery starch material which contains moisture and a starch modifying chemical by heating and stirring the material under vacuum and at a temperature not exceeding 130° C. until the material is substantially completely anhydrous; thereafter, while continuously stirring the anhydrous powdery material and maintaining it under vacuum, heating it to a temperature between 130° and 180° C., supplying to it a predetermined quantity of powdered paraformaldehyde and continuing the heating at a temperature between 130° and 180° C. to form a desired reaction product; and finally cooling the product under continued vacuum.

References Cited in the file of this patent

UNITED STATES PATENTS

| Number | Name | Date |
|---|---|---|
| 1,746,663 | Leuchs | Feb. 11, 1930 |
| 2,165,834 | Bode | July 11, 1939 |
| 2,396,937 | Bauer et al. | Mar. 19, 1946 |
| 2,500,950 | Konigsberg | Mar. 21, 1950 |